US007707452B2

(12) United States Patent
Cordero et al.

(10) Patent No.: US 7,707,452 B2
(45) Date of Patent: *Apr. 27, 2010

(54) RECOVERING FROM ERRORS IN A DATA PROCESSING SYSTEM

(75) Inventors: Edgar Rolando Cordero, Round Rock, TX (US); James Stephen Fields, Jr., Austin, TX (US); Kevin Charles Gower, La Grangeville, NY (US); Eric Eugene Retter, Austin, TX (US); Scott Barnett Swaney, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 12/135,839

(22) Filed: Jun. 9, 2008

(65) Prior Publication Data
US 2008/0270821 A1  Oct. 30, 2008

Related U.S. Application Data

(63) Continuation of application No. 11/054,186, filed on Feb. 9, 2005, now Pat. No. 7,409,580.

(51) Int. Cl.
*G06F 11/00* (2006.01)

(52) U.S. Cl. .......................................... 714/5; 714/42
(58) Field of Classification Search ...................... 714/5, 714/42
See application file for complete search history.

(56) References Cited

U.S. PATENT DOCUMENTS

| 6,516,429 | B1 * | 2/2003 | Bossen et al. ................. 714/47 |
| 6,766,469 | B2 * | 7/2004 | Larson et al. .................. 714/7 |
| 6,981,173 | B2 * | 12/2005 | Ferguson et al. ............... 714/5 |
| 7,028,213 | B2 * | 4/2006 | Majni et al. .................... 714/5 |
| 2005/0240809 | A1 * | 10/2005 | Ash et al. ...................... 714/8 |

* cited by examiner

*Primary Examiner*—Marc Duncan
(74) *Attorney, Agent, or Firm*—Dillon & Yudell LLP

(57) ABSTRACT

A system and method of recovering from errors in a data processing system. The data processing system includes one or more processor cores coupled to one or more memory controllers. The one or more memory controllers include at least a first memory interface coupled to a first memory and at least a second memory interface coupled to a second memory. In response to determining an error has been detected in the first memory, access to the first memory via the first memory interface is inhibited. Also, the first memory interface is locally restarted without restarting the second memory interface.

16 Claims, 4 Drawing Sheets

RECOVERING FROM ERRORS IN A DATA PROCESSING SYSTEM

The present application is a continuation of U.S. patent application Ser. No. 11/054,186, filed on Feb. 9, 2005, entitled "System and Method for Recovering from Errors in a Data Processing System". Applicants claim benefit of priority under 35 U.S.C. §120 to U.S. patent application Ser. No. 11/054,186, which is incorporated by reference herein in its entirety and for all purposes.

BACKGROUND OF THE INVENTION

1. Technical Field

The present invention relates in general to data processing systems, and more particularly, to memory management of data processing systems. Still more particularly, the present invention relates to memory error recovery in data processing systems.

2. Description of the Related Art

Almost all modern computer systems utilize some type of memory for data storage. However, those skilled in this art will appreciate that higher memory storage capacity frequently results in higher latency required to locate and access data on the high-capacity memory. Therefore, to address the access latency problem, many modern data processing systems include a memory hierarchy to keep frequently accessed data in low-capacity, fast access memory (e.g., L1, L2, or L3 cache) and retrieving data from higher-capacity, slower access memory (e.g., dynamic random-access memory (DRAM)) only when data only stored in that memory is required for processing.

However, like all electronic memory storage devices, DRAMs are prone to errors. For example, these errors may be caused by a defective DRAM module. DRAMs may be poorly manufactured or develop a defect due to wear-and-tear. Correctable errors caused by a defective DRAM module can be corrected by an algorithm such as Error Correction Code (ECC), discussed herein in more detail. Uncorrectable errors (UEs) can be handled by deconfiguring, or disabling the defective portion of the memory. discussed herein in more detail. Uncorrectable errors (UEs) can be handled by deconfiguring, or disabling the defective portion of the memory.

Those skilled in this art will appreciate that a way to correct errors in memory is to restart the computer system, which returns the system to a default state. However, the shutdown and restart of the computer system is inefficient and time consuming because the system is typically taken off-line and the services provided by the computer system are unavailable during the shutdown and restart.

Therefore, there is a need for a way to correct memory access errors without the shutdown and restart of the entire computer system.

SUMMARY OF THE INVENTION

A system and method of recovering from errors in a data processing system is disclosed. The data processing system includes one or more processor cores coupled to one or more memory controllers. The one or more memory controllers include at least a first memory interface coupled to a first memory and at least a second memory interface coupled to a second memory.

In response to determining an error has been detected in the first memory, access to the first memory via the first memory interface is inhibited. Also, the first memory interface is locally restarted without restarting the second memory interface.

These and other features and advantages of the present invention will be described in, or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
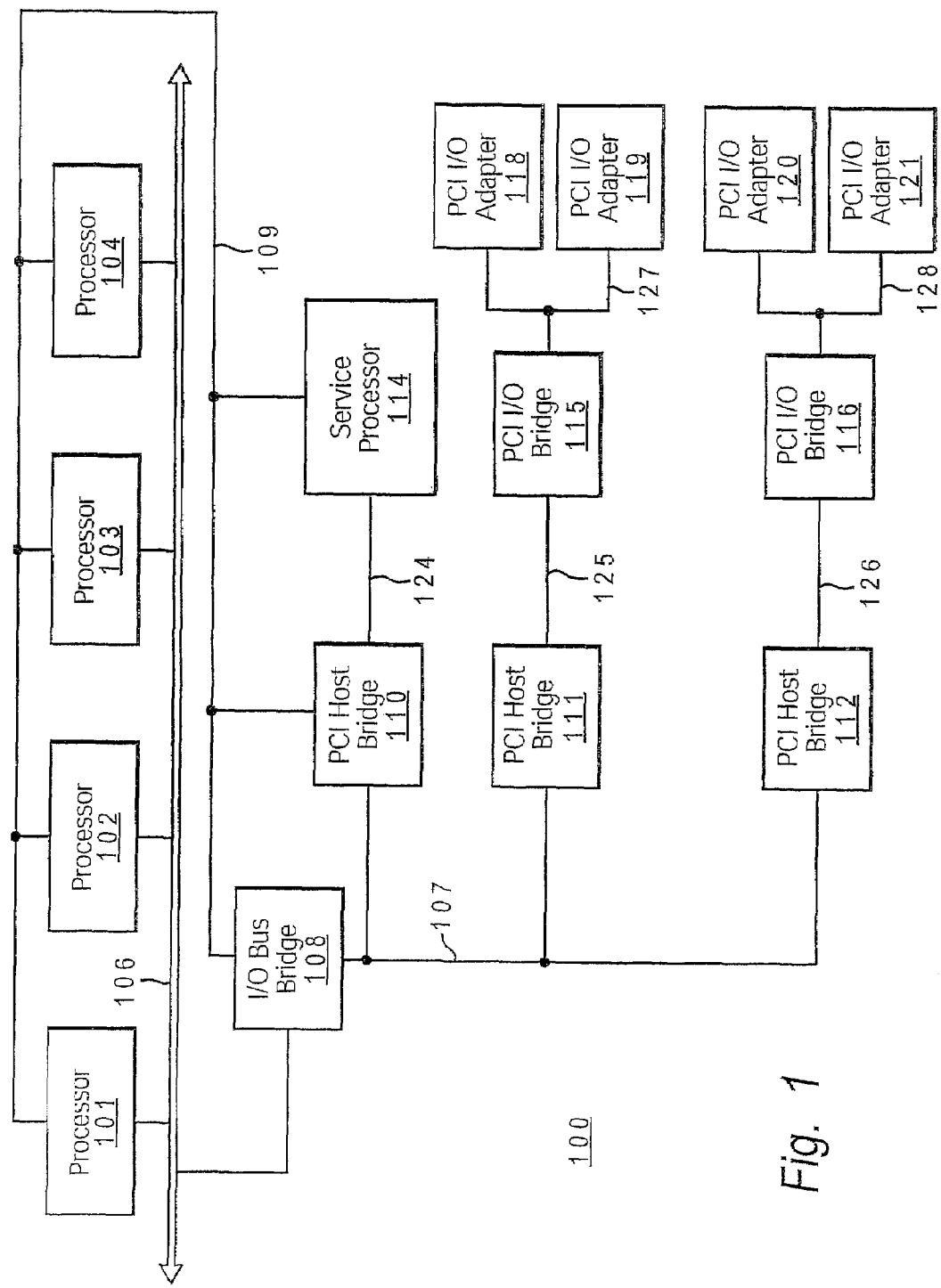
FIG. 1 is a block diagram of an exemplary data processing system in which a preferred embodiment of the present invention may be implemented.

Referring now to the figures and particularly with reference to FIG. 1, there is depicted a block diagram of an exemplary data processing system in which a preferred embodiment of the present invention may be implemented. Data processing system 100 may be a symmetric multi-processor (SMP) system including a plurality of processors 101, 102, 103, and 104 coupled to a system bus 106. For example, data processing system 100 may be an IBM RS/6000, a product of International Business Machines Corporation in Armonk, N.Y., implemented as a server within a network. Processors 101-104 also include memory 206, integrated memory controller (IMC) 208, and memory buffer chip 210 (not pictured in FIG. 1), discussed in more detail in conjunction with FIG. 2. I/O bus bridge 108 is coupled to system bus 106 and provides an interface to I/O bus 107.

A peripheral component interconnect (PCI) host bridge 110 provides an interface for a PCI bus 124 to connect to I/O bus 107. Service processor 114 is coupled to PCI host bridge 110 via PCI bus 124. Service processor 114 is also coupled to processors 101-104, I/O bus bridge 108, and PCI host bridge 110 via JTAG/I²C bus 109. JTAG/I²C bus 109 is a combination of JTAG/scan buses (see IEEE 1149.1) and Phillips I²C buses. However, alternatively, JTAG/I²C bus 109 may be replaced by only Phillips I²C buses or only JTAG/scan buses. During normal operation, service processor 114 monitors various components of data processing system 100 via JTAG/I²C bus 109. This monitoring and subsequent error handling of data processing system 100 is discussed herein in more detail in conjunction with FIG. 4.

Additional PCI host bridges 111 and 112 provide interfaces for additional PCI buses 125 and 126 to connect to I/O bus 107. PCI buses 125 and 126 provide connections for PCI I/O bridges 115 and 116. PCI buses 127 and 128, coupled to PCI I/O bridges 115 and 116, allow for a number of PCI I/O adapters 118-121 to be connected to data processing system 100. Each I/O adapter 118-121 provides an interface between data processing system 100 and I/O devices, such as, for example, modems or network adapters.

During normal operation, when processors 101-104 are executing code from respective operating systems within data processing system 100, service processor 114 enters a mode of monitoring and reporting errors. The type of items monitored by service processor include, for example, the cooling fan speed and operation, thermal sensors, power supply regulators, and recoverable and non-recoverable errors reported by processors 101-104, I/O bus bridge 108, and IMCs 208.

Service processor 114 is responsible for saving and reporting error information related to all the monitored items in data processing system 100. Service processor 114 also takes action based on the type of errors and defined thresholds. For example, service processor 114 may take note of excessive recoverable errors on a processor's memory and determine that this is predictive of a hard error. Based on this determination, service processor 114 may mark that resource for deconfiguration.

Those skilled in this art will appreciate that data processing system 100 can include many additional components not specifically illustrated in FIG. 1. Because such additional components are not necessary for an understanding of the present invention, they are not illustrated in FIG. 1 or discussed further herein. It should be understood, however, that the enhancements to recovery from memory errors provided by the present invention are applicable to data processing systems of any system architecture and are in no way limited to the generalized multi-processing (MP) architecture or symmetric multi-processing (SMP) system structure illustrated in FIG. 1.

Figure 2:
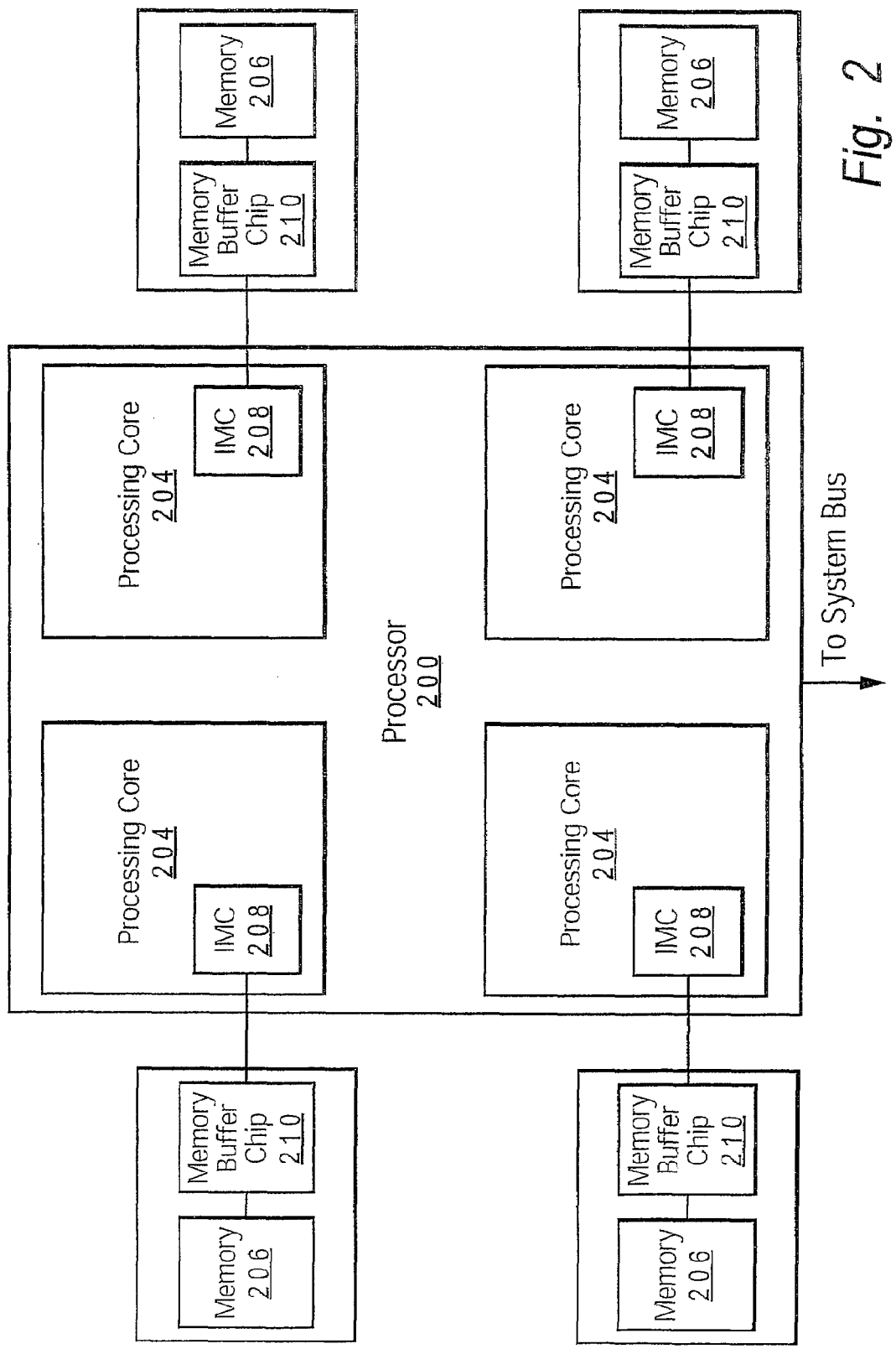
FIG. 2 is a more detailed block diagram of an exemplary processor in the data processing system of FIG. 1.

Referring now to FIG. 2, there is depicted a more detailed block diagram of a processor in data processing system 100 of FIG. 1. Processor 200, similar to processors 101-104 of FIG. 1, includes a collection of processor cores 204. Implemented in each processor core 204 is an integrated memory controller (IMC) 208, is preferably coupled to an off-chip memory buffer chip 210, which is further coupled to memory 206. Those with skill in this art will appreciate that memory buffer chip 210 may also be integrated on memory 206, which may be implemented as a dual-inline memory module (DIMM). As discussed herein in more detail in conjunction with FIG. 3, IMC 208 accepts and relays commands from processor 204 to memory buffer chip 210, which in turn, sends the commands to memory 206. IMC 208 also performs data verification and correction, typically utilizing an error correction algorithm such as the Error Correction Code (ECC).

Figure 3:
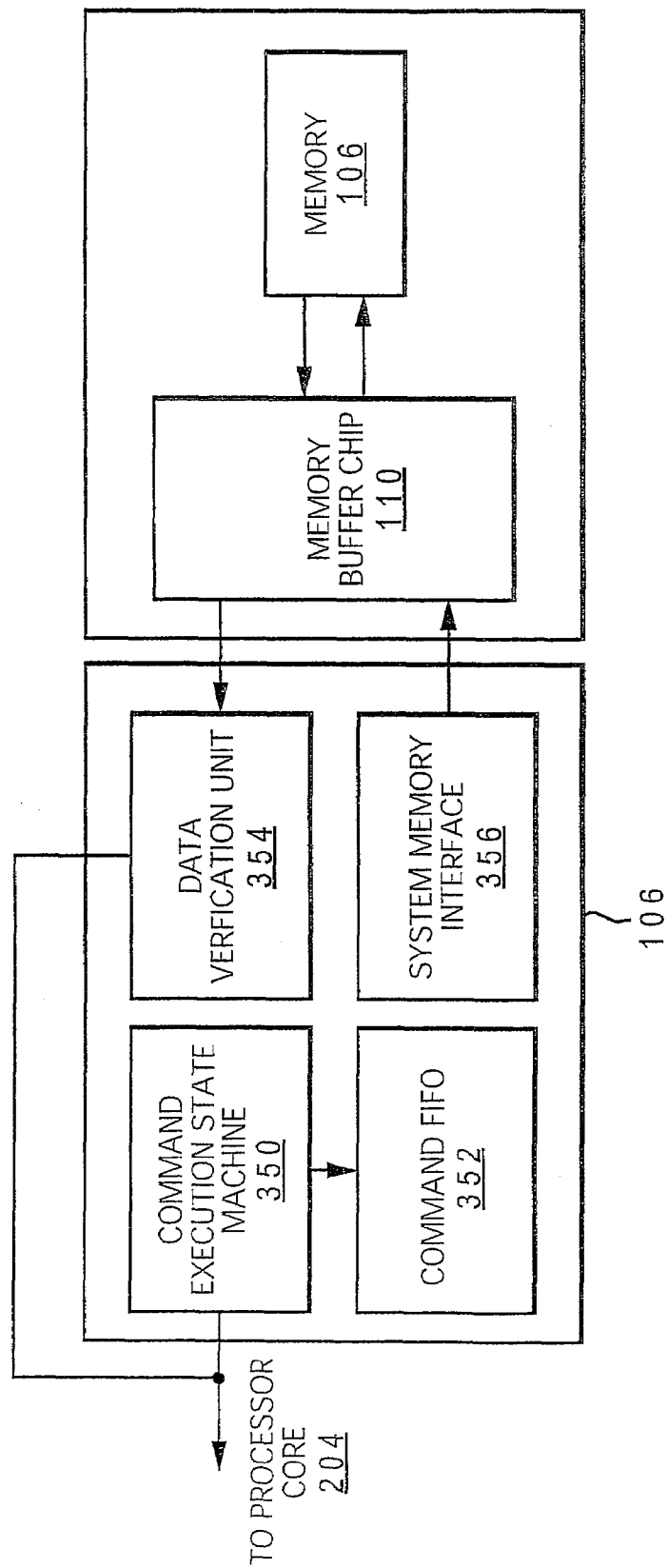
FIG. 3 is a more detailed block diagram of an exemplary memory system in the processor of FIG. 2.

With reference to FIG. 3, there is depicted a more detailed block diagram of IMC 208, memory buffer chip 210, and memory 206 in processor 204 of FIG. 2. As illustrated, IMC 208 includes command execution state machine 350, command first-in-first-out (FIFO) module 352, system memory interface module 356, and data verification module 354.

After receiving commands from processor core 204, command execution state machine 350 re-orders and relays the commands to command FIFO module 352. Command FIFO module 352 operates as a buffer for holding pending commands until the commands are able to be sent to memory 206 via system memory interface 356. System memory interface 356, preferably utilizing DRAM signal protocols (e.g., RAS, CAS, etc.), receives the commands from command FIFO module 352 and translates the commands into direct addresses to a specified DRAM location. Those translations are sent to memory buffer chip 210, which operates as a buffer for commands and data between IMC 208 and memory 206.

Those skilled in this art will appreciated that there are two types of errors that can occur in a memory system, such as the memory system depicted in FIG. 2. The first type of error is typically referred to as a "repeatable" or "hard" error. A hard error is usually indicative of faulty hardware, such as a failed DRAM, a loose dual-inline memory module (DIMM), motherboard defects, or other physical problems. These faulty hardware problems will consistently return incorrect results. For example, a bit in a DRAM may be stuck so that the bit constantly returns a "0", regardless of what data is written to the bit. Because hard errors are repeatable and usually consistent, they are relatively easy to diagnose and correct.

Typically, hard errors that cannot be corrected by an error correction algorithm such as ECC are handled by deconfiguring, or disabling, a specific portion of memory 206. Those well-skilled in the art will appreciate that memory 206 may be deconfigured at any granularity supported by a system such as a specific row in a DRAM, a DRAM chip, or an entire DIMM. Memory access requests that usually reference a deconfigured portion of memory 206 can be re-routed to another, active portion of memory 206.

The second type of memory system error is typically called a "transient" or "soft" error. A soft error occurs when a bit in memory 206 reads back an incorrect value once, but subsequently functions correctly. Because of its transient nature, a soft error is much more difficult to diagnose. Soft errors may sometimes be caused by physical defects of DRAMs, DIMMs, poor motherboard connections, memory system timing problems, static shocks, or even stray radioactivity that is naturally present in computer systems and computer system components.

Regardless of whether an error is characterized as a hard or soft error, those skilled in this art will appreciate that there exist protocols, such as error correction code (ECC), that can both detect and correct a special category of errors called correctable errors. A common type of correctable error is a single-bit error. A single-bit error is an error that occurs when a single bit has accidentally flipped to an incorrect value (e.g., the bit reads "0" instead of "1" or vice versa). Consequently, multi-bit errors are errors that involve more than one bit and are not correctable via an error correction code such as ECC. Therefore, as discussed herein in more detail, the error recovery method of the present invention requires data verification module 354 to determine whether or not an error has occurred in memory 206, determine the nature of the error, and attempt to recover from the error without requiring a full shutdown and restart of data processing system 100.

Figure 4:
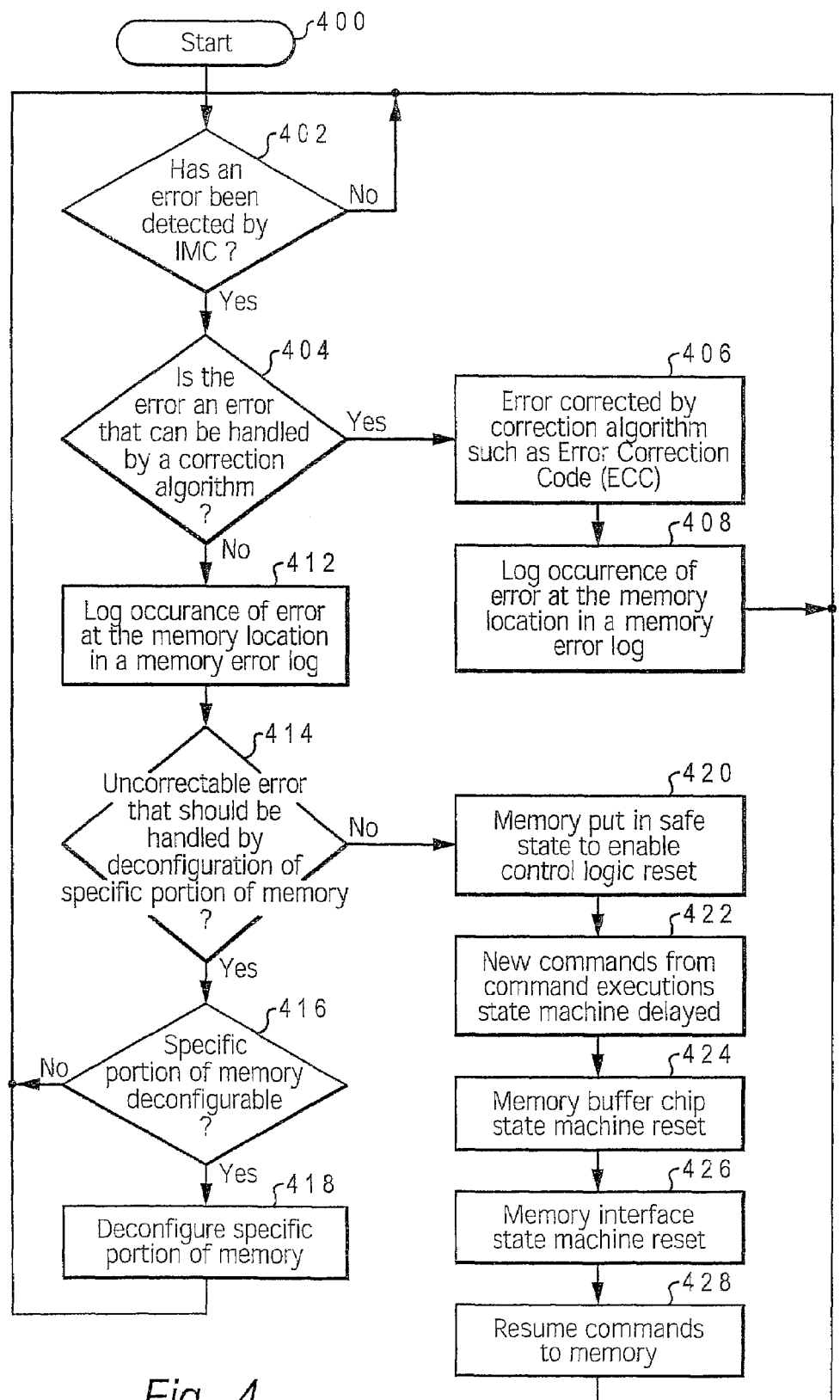
FIG. 4 is a high-level logical flowchart of an exemplary memory recovery procedure according to a preferred embodiment of the present invention.

Referring now to FIG. 4, there is illustrated a high-level logical flowchart of an exemplary memory recovery procedure in accordance with a preferred embodiment of the present invention. The process begins at step 400 and proceeds to step 402, which depicts whether or not IMC 208 has detected an error in a memory location in memory 206. If IMC 208 has not detected an error in a memory location in memory 206, the process iterates at step 402.

However, if IMC 208 has detected an error in a memory location in memory 206, the process continues to step 404, which illustrates data verification module 354 determining whether or not the detected error is an error correctable by a correction algorithm such as ECC. As previously discussed, an error correctable by a correction algorithm may be an error in memory 206 in which a single bit has been erroneously flipped. These single-bit errors may be corrected by ECC. The process then continues to step 406, which depicts the detected correctable error corrected by data verification module 354 utilizing an error correction protocol such as ECC. The process proceeds to step 408, which depicts service processor 114 logging the error in a memory error log that can be stored in memory 206 or any other memory location.

Returning to step 404, if data verification module 354 determines that the detected error in a memory location in memory 206 is not an error that can be handled by a correction algorithm, the process continues to step 412, which depicts service processor 114 logging the error in a memory error log that can be stored in memory 206 or any other memory location. The process continues to step 414, which illustrates service processor 114 determining whether or not the detected error should be handled by deconfiguration of the specific portion of memory. If service processor 114 determines the detected error is an uncorrectable error such as a hard error, the detected error should be handled by deconfiguration of that specific portion of memory, if possible.

If service processor 114 determines that the detected error is an uncorrectable error that should be handled by the deconfiguration of the specific portion of memory, the process proceeds to step 416, which depicts service processor 114 determining whether the memory location in which the error occurred is deconfigurable. As previously discussed, some errors result from defective or faulty memory. The present invention allows deconfiguration of memory 206 at any granularity supported by data processing system 100, such as the deconfiguring of a specific DRAM row, DRAM chip, or entire DIMM. Those with skill in this art will appreciate that some memory locations that generate errors cannot be deconfigured because of system limitations such as the problem location covering too high of a range within memory 106 or the present state of the machine. For example, in some instances, if the system is presently in a runtime state, memory 106 may not be deconfigurable. If service processor 114 determines that the memory location that generated the error is not deconfigurable, the process returns to step 402 and continues in an iterative fashion. However, if service processor 114 determines that the memory location generating the errors is deconfigurable, service processor 114 deconfigures the memory location. The process then returns to step 402 and proceeds in an iterative fashion.

System memory interface 356 and memory buffer chip 210 both utilize state machines to coordinate the transfer of data and instructions between IMC 208 and memory 206. Sometimes, if data verification module 354 has determined that the detected error in memory 206 is not the result of an uncorrectable error or an error that may be handled by a correction algorithm such as ECC, it is reasonable to determine that the error may be the result of desynchronization of the state machines implemented in IMC 208 and memory buffer chip 210.

A periodic external event, such as a clock signal synchronized with a state machine is utilized to determine when the state machine will decide to transition from a current state to a new state. When the clocking event occurs, the state machine samples the current inputs and the current state to compute a new state. However, for various reasons, state machines may become desynchronized from the external clock signal. A desynchronized state machine is considered corrupted because of the unpredictable sampling of the input events, which result in unreliable output events and errors in memory access to the DRAM. A way to correct this problem is to restart the memory interface. The present invention provides a way to locally restart the memory system without requiring a complete restart of the data processing system.

Returning to step 414, if data verification module 354 or service processor 114 determines that the memory location generating the error is an uncorrectable error and should not be handled via deconfiguration of the specific portion of memory, the process continues to step 420, which depicts IMC 208 placing memory 206 in a safe state to enable control logic reset. The safe state typically involves idling command execution state machine 350 and precharging all DRAM banks in memory 206 to preserve the data store in the DRAM. The process then continues to step 422, which illustrates inhibiting and delaying the issuance of new commands from command execution state machine 350. The process proceeds to step 424, which depicts the reset of memory buffer chip 210. The process continues to step 426, which illustrates the reset of system memory interface 356. After the reset of both memory buffer chip 210 and system memory interface 356, the process continues to step 428, which illustrates command execution state machine 350 resuming the issuance of commands to memory 206. The process then returns to step 402 and proceeds in an iterative fashion. Both IMC 208 and memory buffer chip 210 utilize state machines perform the transfer of data and instructions between memory 206 and the rest of data processing system 100.

As disclosed, the present invention provides a system and method of locally restarting a system memory controller to correct errors in system memory. First, a data verification module monitors a memory for errors in locations in memory. Next, the data verification module determines the character of the error (i.e., whether it is a single-bit or multi-bit error). If the data verification module determines that the error is a correctable error, the error is corrected utilizing an error corrector algorithm, such as ECC. The error is then logged by a service processor. However, if the data verification module determines that the error is an uncorrectable, the data verification module may initiate a restart. The error is logged by the service processor, which further determines whether or not the memory location may require a restart. Those skilled in this art will appreciate that the hardware-initiated restart will occur more quickly than one begun by the service processor and will therefore correct the problem sooner after the initial error, which prevents more errors from returning to the processor. If the memory location has not recovered after restart, the service processor determines if the memory location generating the error is eligible for deconfiguration. If the memory location can be deconfigured, the service processor deconfigures the memory location.

If, however, the data verification module or service processor determines that the memory location may operate correctly after restart, the memory controller performs a local restart of the memory system after placing the memory into a safe mode. This system and method enables the data processing system to recover from errors without a complete restart of the system that would result in data loss and interruption of the service provided by the data processing system.

While this invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitations, recordable-type media such as floppy disks or CD-ROMs and transmission-type media such as analog or digital communication links.

What is claimed is:

1. A method for recovering from errors in a data processing system including one or more processor cores coupled to one or more memory controllers, said one or more memory controllers including at least a first system memory interface coupled to a first memory and at least a second system memory interface coupled to a second memory, said method comprising:

in response to determining an error has been detected in said first memory, inhibiting access to said first memory via said first system memory interface in response to commands received from said processor core; and locally restarting said first system memory interface without restarting said second system memory interface, wherein said first system memory interface receives said commands from said processor core via a command first-in-first-out (FIFO) module and translates said commands into direct addresses to a specified location in said first memory.

2. The method according to claim 1, wherein said at least a first system memory interface is coupled to said at least a first memory buffer and said at least a second system memory interface is coupled to said at least a second memory buffer, said method further including:

locally restarting said first memory buffer without restarting said second memory buffer.

3. The method according to claim 1 further including:

resuming access to said first memory via said first system memory interface in response to commands received from said processor core.

4. The method according to claim 1, wherein said inhibiting further includes:

inhibiting access to said first memory in response to determining said error has been detected, wherein said error is not a correctable error.

5. The method according to claim 1, wherein said inhibiting further includes:

inhibiting access to said first memory in response to determining said error has been detected, wherein said error is not an unrecoverable error that may be corrected by deconfiguring a portion of said first memory.

6. A data processing system, comprising:

one or more processing cores;

one or more memory controllers coupled to said one or more processing cores, said one or more memory controllers including:

at least a first system memory interface coupled to a first memory; and at least a second system memory interface coupled to a second memory;

an error detector for determining whether an error has been detected in said first memory, and in response to said determining, for inhibiting access to said first memory via said first system memory interface in response to commands received from said processor core, and for locally restarting said first memory interface without restarting said second memory interface, wherein said first system memory interface receives said commands from said processor core via a command first-in-first-out (FIFO) module and translates said commands into direct addresses to a specified location in said first memory.

7. The data processing system according to claim 6, wherein said error detector is integrated within said one or more memory controllers.

8. The data processing system according to claim 6, further comprising:

at least a first memory buffer coupled to said at least a first system memory interface and said first memory, wherein said at least a first memory buffer is configured for buffering data and instructions between said first system memory interface and said first memory; and at least a second memory buffer coupled to said at least a second system memory interface and said second memory, wherein said at least second memory buffer is configured for buffering data and instructions between said second system memory interface and said second memory, and wherein said first memory buffer is locally restarted without restarting said second memory buffer, in response to determining said error has been detected in said first memory.

9. The data processing system according to claim 6, wherein said one or more memory controllers further include:

a command execution module configured for controlling access of said one or more processing cores to said first memory and to said second memory, and for resuming access to said first memory via said first system memory interface in response to commands received from said one or more processing cores.

10. The data processing system according to claim 6, wherein said error is not a correctable error.

11. The data processing system according to claim 6, wherein said error is not an unrecoverable error that may be corrected by deconfiguring a portion of said first memory.

12. A computer program product for recovering from errors in a data processing system, including one or more processor cores coupled to one or more memory controllers, said one or more memory controllers including at least a first system memory interface coupled to a first memory and at least a second system memory interface coupled to a second memory, said computer program product comprising:

instructions stored in computer-readable media for inhibiting access to said first memory via said first system memory interface in response to commands received from said processor core, in response to determining an error has been detected in said first memory; and instructions stored in computer-readable media for locally restarting said first system memory interface without restarting said second system memory interface, wherein said first system memory interface receives said commands from said processor core via a command first-in-first-out (FIFO) module and translates said commands into direct addresses to a specified location in said first memory.

13. The computer program product for recovering from errors in a data processing system according to claim 12, wherein said at least a first system memory interface is coupled to said at least a first memory buffer and said at least a second system memory interface is coupled to said at least a second memory buffer, said computer program product further including:

instructions stored in computer-readable media for locally restarting said first memory buffer without restarting said second memory buffer.

14. The computer program product for recovering from errors in a data processing system according to claim 12, further including:

instructions stored in computer-readable media for resuming access to said first memory via said first system memory interface in response to commands received from said processor core.

15. The computer program product for recovering from errors in a data processing system according to claim 12, further including:

instructions stored in computer-readable media for inhibiting access to said first memory in response to determining said error has been detected, wherein said error is not a single-bit error.

16. The computer program product for recovering from errors in a data processing system according to claim 12, further including:

instructions stored in computer-readable media for inhibiting access in said first memory in response to determining said error has been detected, wherein said error is not an unrecoverable error that may be corrected by deconfiguring a portion of said first memory.

* * * * *